United States Patent
Tang et al.

(10) Patent No.: US 12,525,647 B2
(45) Date of Patent: *Jan. 13, 2026

(54) POSITIVE ELECTRODE PLATE AND LITHIUM-ION SECONDARY BATTERY

(71) Applicant: ZHUHAI COSMX BATTERY CO., LTD., Zhuhai (CN)

(72) Inventors: Weichao Tang, Zhuhai (CN); Suli Li, Zhuhai (CN); Wei Zhao, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 550 days.

This patent is subject to a terminal disclaimer.

(21) Appl. No.: 18/069,818

(22) Filed: Dec. 21, 2022

(65) Prior Publication Data

US 2023/0129009 A1   Apr. 27, 2023

Related U.S. Application Data

(63) Continuation of application No. PCT/CN2021/116760, filed on Sep. 6, 2021.

(30) Foreign Application Priority Data

Sep. 15, 2020  (CN) .......................... 202010970602.5

(51) Int. Cl.
H01M 10/0565 (2010.01)
H01M 4/02 (2006.01)
H01M 4/525 (2010.01)
H01M 4/62 (2006.01)

(52) U.S. Cl.
CPC ....... *H01M 10/0565* (2013.01); *H01M 4/525* (2013.01); *H01M 4/623* (2013.01); *H01M 2004/021* (2013.01); *H01M 2004/028* (2013.01); *H01M 2300/0082* (2013.01)

(58) Field of Classification Search
None
See application file for complete search history.

(56) References Cited

U.S. PATENT DOCUMENTS

2010/0009266 A1* 1/2010 Itoh ..................... H01M 10/052
429/231.95
2016/0359195 A1* 12/2016 Makino ............ C08F 220/1804
2020/0227781 A1* 7/2020 Ahn .................. H01M 10/0569
2021/0098824 A1* 4/2021 Nishio .................... H01B 1/06
2023/0265223 A1* 8/2023 Tang ..................... C08F 20/06
429/492

FOREIGN PATENT DOCUMENTS

| CN | 101218705 A | 7/2008 | |
| CN | 101563807 A | 10/2009 | |
| CN | 109119591 A | 1/2019 | |
| CN | 110808408 A | 2/2020 | |
| CN | 111253523 A | 6/2020 | |
| CN | 111384436 A | 7/2020 | |
| CN | 111490227 A | 8/2020 | |
| CN | 111533851 A | 8/2020 | |
| CN | 115894803 A * | 4/2023 | |
| JP | 2002216844 A * | 8/2002 | |
| JP | 2014186945 A | 10/2014 | |
| WO | 2013115264 A1 | 8/2013 | |
| WO | 2016017758 A1 | 2/2016 | |
| WO | 2016017759 A1 | 2/2016 | |
| WO | WO-2020107857 A1 * | 6/2020 | ........ H01M 10/0565 |

OTHER PUBLICATIONS

Machine translation of JP2002-216844 A, published on Aug. 2, 2002 (Year: 2002).*
International Search Report and Written Opinion issued in corresponding PCT Application No. PCT/CN2021/116760, dated Nov. 22, 2021.

* cited by examiner

*Primary Examiner* — Anca Eoff
(74) *Attorney, Agent, or Firm* — Westbridge IP LLC

(57) ABSTRACT

Disclosed are a positive electrode plate and a lithium-ion secondary battery containing the positive electrode plate. In the present disclosure, a polymer electrolyte prepared from a polymer that is different from a polymer used in the conventional technology, and the solid electrolyte, having not only a binding function but also a lithium-conducting function, may replace a binder and a solid electrolyte in an existing electrode plate, so that transmission performance of lithium ions can be effectively improved, and an internal resistance of a solid-state battery can be reduced. In addition, a porosity of a positive electrode plate containing the solid electrolyte is low. This effectively improves energy density and cycling performance of the solid-state battery. The positive electrode plate containing the solid electrolyte may be applied to a battery system having high energy density, thereby broadening a disclosure range of the positive electrode plate.

16 Claims, 1 Drawing Sheet

POSITIVE ELECTRODE PLATE AND LITHIUM-ION SECONDARY BATTERY

CROSS-REFERENCE TO RELATED APPLICATIONS

This disclosure is a continuation of International Application No. PCT/CN2021/116760, filed on Sep. 6, 2021, which claims priority to Chinese Patent Application No. 202010970602.5, filed on Sep. 15, 2020. The disclosures of the aforementioned disclosures are hereby incorporated by reference in their entireties.

TECHNICAL FIELD

The present disclosure relates to the technical field of secondary batteries, and in particular, to a positive electrode plate and a lithium-ion secondary battery containing the positive electrode plate.

BACKGROUND

Lithium-ion secondary batteries have been widely used in the field of energy storage, power vehicles, notebook computers, mobile phones, cameras, and other consumer electronic products due to advantages such as high energy density, long cycle life, low self-discharge rate, and environmental protection. However, energy density and safety are main factors that currently limit development of lithium-ion secondary batteries. Being a next-generation lithium-ion secondary battery most likely to be used in practical application, a solid-state battery has great application potential.

However, a main difficulty of an existing solid-state battery is that a solid-solid interface, particularly a solid-solid interface between a positive electrode active material and a solid electrolyte in a positive electrode plate of the solid-state battery, have poor lithium-conducting performance and electricity-conducting performance. The positive electrode plate of the solid-state battery mainly includes a positive electrode active material, a conductive agent, a solid polymer electrolyte, a binder, and a lithium salt. A positive electrode plate in a conventional liquid system has a relatively high porosity; and a positive electrode plate of a solid-state battery prepared with reference to the conventional liquid system also has a high porosity. As a result, the positive electrode plate of the solid-state battery has a great internal resistance. Meanwhile, to satisfy a requirement of high energy density, the positive electrode active material generally uses a positive electrode active material with a high voltage and a high gram capacity. However, in a case that a positive electrode plate of a conventional solid-state battery is at a high voltage, a solid polymer electrolyte is oxidized, decomposed, or the like, destroys a lithium-conducting and electricity-conducting network of the positive electrode plate of the solid-state battery, and thus deteriorating performance of the battery. Moreover, the positive electrode plate of the solid-state battery further has problems such as poor interfacial contact, which directly affects cycling performance of the solid-state battery.

SUMMARY

To overcome defects in the prior art, the present disclosure provides a positive electrode plate and a lithium-ion secondary battery containing the positive electrode plate. An all-solid-state battery composed of the positive electrode plate has the advantages that interfacial contact between the positive electrode plate and a solid electrolyte is good during charging and discharging of the battery, and that a porosity on a surface of the positive electrode plate is low. Therefore, cycling performance of the solid-state battery can be greatly improved.

An objective of the present disclosure is implemented by using the following technical solutions.

A positive electrode plate, including a positive electrode current collector and a positive electrode active material layer applied on a surface of either or both sides of the positive electrode current collector; where the positive electrode active material layer includes a positive electrode active material, a conductive agent, and a polymer electrolyte; the polymer electrolyte includes a polymer and a lithium salt; and the polymer includes a repeated unit represented by the following formula 1:

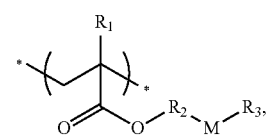

(Formula 1)

where $R_1$ is selected from H or a $C_{1-6}$ alkyl group; $R_2$ is a linking group; $R_3$ is an end-capping group; M is selected from a borate chain segment, an aluminate chain segment, or a phosphate chain segment; and * denotes a linking end.

According to the present disclosure, $R_1$ is selected from H or a C1-3 alkyl group, for example, $R_1$ is selected from H or a methyl group.

According to the present disclosure, $R_3$ is selected from H, OH, or COOH.

According to the present disclosure, the borate chain segment has a structural unit represented by formula 2 or formula 3:

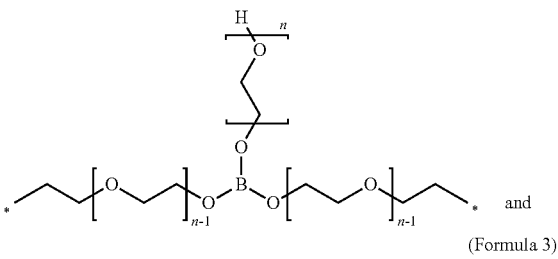

(Formula 2)

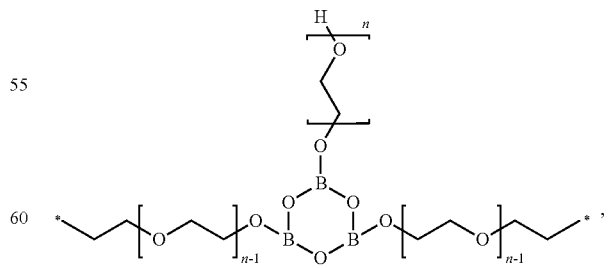

(Formula 3)

where * denotes a linking end, and n is a polymerization degree.

According to the present disclosure, the aluminate chain segment has a structural unit represented by formula 4:

(Formula 4)

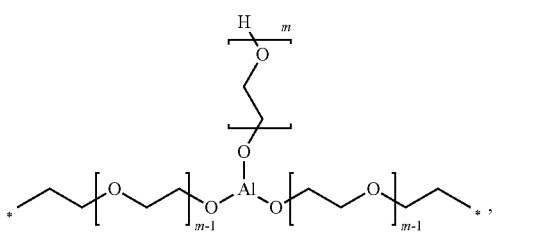

where * denotes a linking end, and m is a polymerization degree.

According to the present disclosure, the phosphate chain segment has a structural unit represented by formula 5:

(Formula 5)

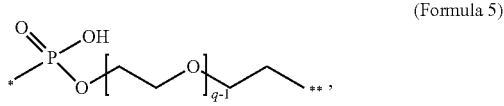

where * denotes a linking end to $R_3$, ** denotes a linking end to $R_2$, and q is a polymerization degree.

According to the present disclosure, a number average molecular weight of M ranges from 200 Da to 10,000 Da.

According to the present disclosure, the polymer is selected from at least one of poly(polyether borate acrylate), poly(polyether aluminate acrylate), poly(polyether phosphate acrylate), poly(polyether borate methacrylate), poly(polyether aluminate methacrylate), or poly(polyether phosphate methacrylate).

According to the present disclosure, a number average molecular weight of the polymer ranges from 4,000 Da to 300,000 Da.

According to the present disclosure, a monomer for preparing the polymer is selected from a compound represented by the following formula 6:

(Formula 6)

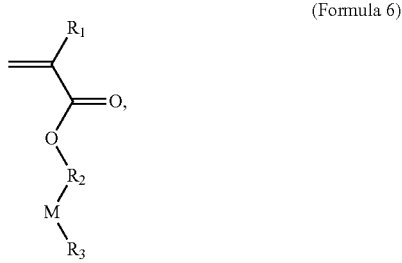

where $R_1$, $R_2$, $R_3$, and M are defined as above.

According to the present disclosure, the compound represented by formula 6 is selected from at least one of polyether borate acrylate, polyether aluminate acrylate, polyether phosphate acrylate, polyether borate methacrylate, polyether aluminate methacrylate, or polyether phosphate methacrylate.

According to the present disclosure, the positive electrode active material layer further includes a binder.

According to the present disclosure, the positive electrode active material layer includes components of the following mass percentage: 70 wt % to 98 wt % of the positive electrode active material, 1 wt % to 15 wt % of the conductive agent, 1 wt % to 28 wt % of the polymer electrolyte, and 0 wt % to 10 wt % of the binder.

According to the present disclosure, the polymer electrolyte includes components of the following mass percentage: 60 wt % to 90 wt % of the polymer, 10 wt % to 30 wt % of the lithium salt, and 0 wt % to 10 wt % of an additive.

According to the present disclosure, a porosity of the positive electrode plate is less than 5%.

According to the present disclosure, an elongation rate of the positive electrode active material layer in the positive electrode plate ranges from 30% to 300%.

The present disclosure further provides a solid-state battery. The solid-state battery includes the foregoing positive electrode plate.

The present disclosure has the following beneficial effects:

The present disclosure provides a positive electrode plate and a lithium-ion secondary battery containing the positive electrode plate. In the present disclosure, a polymer electrolyte prepared from a polymer is used as a solid electrolyte of the positive electrode plate, and the solid electrolyte, having not only a binding function but also a lithium-conducting function, may replace a binder and a solid electrolyte in an existing electrode plate, so that transmission performance of lithium ions can be effectively improved, and an internal resistance of a solid-state battery is reduced. In addition, a porosity of a positive electrode plate containing the solid electrolyte is low, that is, about 5% or lower. This greatly decreases pores and holes in the positive electrode plate, increases content of a positive electrode active material per unit volume, improves transmission of lithium ions and electrons, and effectively improves energy density and cycling performance of the solid-state battery. The positive electrode plate containing the solid electrolyte may be applied to a battery system having high energy density, thereby broadening an application range of the battery system.

The solid electrolyte of the present disclosure uses a functional polymer monomer to replace polyethylene oxide. A molecular weight of the functional polymer monomer ranges from 100 to 10000. Micromolecules of the functional polymer monomer may be efficiently dissolved in a solvent, so that prepared positive electrode active material layer slurry has low viscosity, and is easy to process. Moreover, the micromolecules of the functional polymer monomer may be fully combined with a positive electrode active material, a conductive agent, a binder, a lithium salt, and an additive. The micromolecules of the functional polymer monomer further include acrylic ester groups, which can be well absorbed on surfaces of the positive electrode active material and the conductive agent, forming a continuous electricity-conducting and lithium-conducting network, and effectively improving battery performance. The micromolecules of the functional polymer monomer are in a liquid or semi-solid state at room temperature, but are converted to be in a fluid state in a drying process of the positive electrode plate. In one aspect, the fluid-state micromolecules of the polymer monomer may fully enter space between solid particles of the positive electrode active material, so that the positive electrode plate has a higher compacted density and a lower porosity. In the other aspect, the micromolecules of the polymer monomer are well combined with the binder, the conductive agent, and the positive electrode active material effectively via in-situ polymerization, thereby forming a lithium-conducting and electricity-conducting network that is integral and complete.

A polyethylene oxide solid electrolyte used in a positive electrode plate of a conventional solid-state battery has a poor resistance to a high voltage, especially a voltage higher than 3.8 V. A polymer electrolyte is introduced in the positive electrode plate of the present disclosure. Polyether borate, polyether aluminate, and polyether phosphate are introduced in the polymer electrolyte, so that high voltage-resistant performance of the solid polymer electrolyte can be effectively improved. Compared with a conventional polyethylene oxide positive electrode plate, the positive electrode plate has better high voltage-resistant performance.

Compared with a conventional polyethylene oxide polymer electrolyte, the polymer electrolyte of the present disclosure has higher lithium ion conductivity and higher lithium ion continuity. Compared with the polyethylene oxide polymer electrolyte, the polymer electrolyte of the present disclosure has a branched chain structure, thereby having a lower crystallization degree. Therefore, in an amorphous region of the solid polymer electrolyte, lithium ions have higher conductivity. In addition, branched chains of the polymer include polyether borate, polyether aluminate, and polyether phosphate. This can effectively promote dissociation of the lithium salt in the solid polymer electrolyte, improve lithium ion continuity, and broaden an electrochemical window of the solid electrolyte.

DETAILED DESCRIPTION OF THE EMBODIMENTS

<Positive Electrode Plate>

Figure 1:
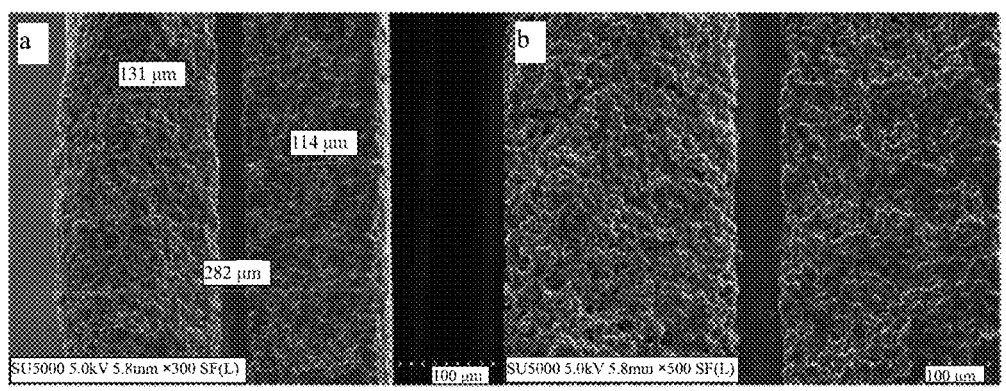
FIG. 1 is a cross-section scanning electron microscope (SEM) image of a positive electrode plate prepared according to Example 6; wherein, (a) of FIG. 1 is a SEM image magnified by 300 times: (b) of FIG. 1 is a SEM image magnified by 500 times; and the scale bar is 100 μm.

As described above, the present disclosure provides a positive electrode plate. The positive electrode plate includes a positive electrode current collector and a positive electrode active material layer applied on a surface of either or both sides of the positive electrode current collector. The positive electrode active material layer includes a positive electrode active material, a conductive agent, and a polymer electrolyte. The polymer electrolyte includes a polymer and a lithium salt, and the polymer includes a repeated unit represented by the following formula 1:

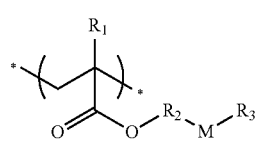

(Formula 1)

In formula 1, $R_1$ is selected from H or a C1-6 alkyl group; $R_2$ is a linking group; $R_3$ is an end-capping group; M is selected from a borate chain segment, an aluminate chain segment, or a phosphate chain segment; and * denotes a linking end.

According to a solution of the present disclosure, $R_1$ is selected from H or a C1-3 alkyl group, for example, $R_1$ is selected from H or a methyl group.

According to a solution of the present disclosure, $R_3$ is selected from H, OH, or COOH.

According to a solution of the present disclosure, $R_2$ is a linking group obtained after a reaction between hydroxyl in

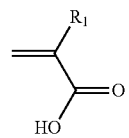

and $R_3'$ in

Actually, $R_2$ is a residue of $R_3'$. $R_3'$ and $R_3$ are the same or different, and are separately selected from H, OH, or COOH.

According to a solution of the present disclosure, the borate chain segment has a structural unit represented by formula 2 or formula 3:

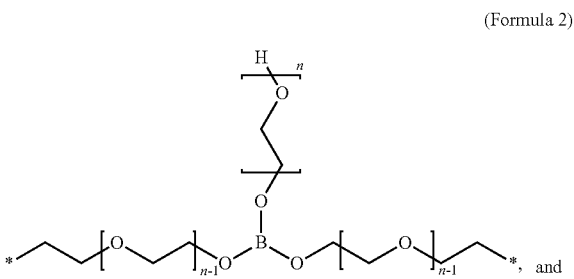

(Formula 2)

, and

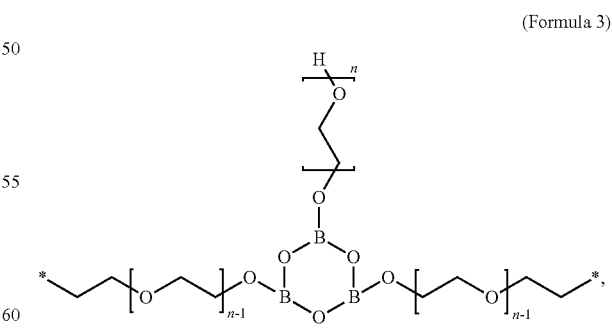

(Formula 3)

where * denotes a linking end, and n is a polymerization degree.

According to a solution of the present disclosure, the aluminate chain segment has a structural unit represented by formula 4:

(Formula 4)

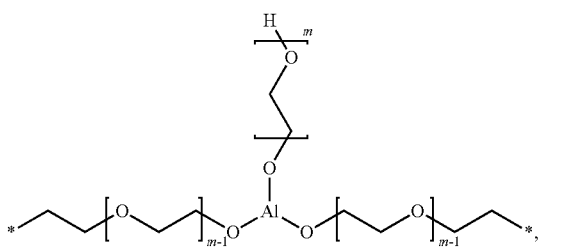

where * denotes a linking end, and m is a polymerization degree.

According to a solution of the present disclosure, the phosphate chain segment has a structural unit represented by formula 5:

(Formula 5)

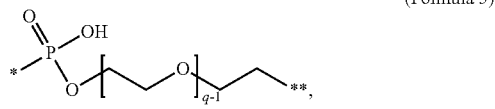

where * denotes a linking end to $R_3$, ** denotes a linking end to $R_2$, and q is a polymerization degree.

According to a solution of the present disclosure, a number average molecular weight of M ranges from 200 Da to 10,000 Da.

According to a solution of the present disclosure, the polymer is selected from at least one of poly(polyether borate acrylate), poly(polyether aluminate acrylate), poly(polyether phosphate acrylate), poly(polyether borate methacrylate), poly(polyether aluminate methacrylate), or poly(polyether phosphate methacrylate).

According to a solution of the present disclosure, a number average molecular weight of the polymer ranges from 4,000 Da to 300,000 Da.

According to a solution of the present disclosure, a monomer for preparing the polymer is selected from a compound represented by the following formula 6:

(Formula 6)

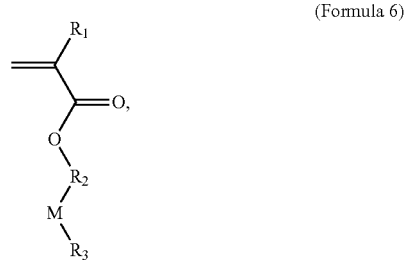

where $R_1$, $R_2$, $R_3$, and M are defined as above.

According to a solution of the present, the compound represented by formula 6 is selected from at least one of polyether borate acrylate, polyether aluminate acrylate, polyether phosphate acrylate, polyether borate methacrylate, polyether aluminate methacrylate, or polyether phosphate methacrylate.

According to a solution of the present disclosure, the positive electrode active material layer further includes a binder.

According to a solution of the present disclosure, the positive electrode active material layer includes components of the following mass percentage: 70 wt % to 98 wt % of the positive electrode active material, 1 wt % to 15 wt % of the conductive agent, 1 wt % to 28 wt % of the polymer electrolyte, and 0) wt % to 10 wt % of the binder.

For example, the mass percentage of the positive electrode active material is 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, or 98 wt %.

For example, the mass percentage of the conductive agent is 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

For example, the mass percentage of the polymer electrolyte is 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, or 28 wt %.

For example, the mass percentage of the binder is 0 wt %, 1 wt %, 2 wt %, 3 wt %, 4 wt %, 5 wt %, 6 wt %, 7 wt %, 8 wt %, 9 wt %, or 10 wt %.

According to a solution of the present disclosure, the positive electrode active material is selected from a combination of one or more of lithium iron phosphate ($LiFePO_4$), lithium cobalt oxide ($LiCoO_2$), lithium nickel cobalt manganese oxide ($Li_zNi_xCo_yMn_{1-x-y}O_2$, where $0.95 \leq z \leq 1.05$, $x>0$, $y>0$, and $0<x+y<1$), lithium manganate ($LiMnO_2$), lithium nickel cobalt aluminum oxide ($Li_zNi_xCo_yAl_{1-x-y}O_2$, where $0.95 \leq z \leq 1.05$, $x>0$, $y>0$, and $0.8 \leq x+y<1$), lithium nickel cobalt manganese aluminum oxide ($Li_zNi_xCO_yMn_wAl_{1-x-y-w}O_2$, where $0.95 \leq z \leq 1.05$, $x>0$, $y>0$, $w>0$, and $0.8 \leq x+y+w<1$), a nickel-cobalt-aluminum-tungsten material, a lithium-rich manganese-based solid solution positive electrode material ($xLi_2MnO_3 \cdot_{(1-x)}LiMO_2$, where M=Ni/Co/Mn), lithium nickel cobalt oxide ($LiNi_xCo_yO_2$, where $x>0$, $y>0$, and $x+y=1$), lithium nickel titanium magnesium oxide ($LiNi_xTi_yMg_zO_2$, where $x>0$, $y>0$, $z>0$, and $x+y+z=1$), lithium nickel oxide ($Li_2NiO_2$), spinel lithium manganese oxide ($LiMn_2O_4$), and a nickel-cobalt-tungsten material.

According to a solution of the present disclosure, the conductive agent is selected from one or more of conductive carbon black, ketjen black, conductive fiber, a conductive polymer, acetylene black, a carbon nanotube, graphene, flake graphite, a conductive oxide, or a metal particle.

According to a solution of the present disclosure, the binder is selected from at least one of polyvinylidene fluoride (PVDF), polytetrafluoroethylene (PTFE), polyvinylidene fluoride-hexafluoropropylene, or lithium polyacrylate (PAA-Li).

According to a solution of the present disclosure, the polymer electrolyte includes components of the following mass percentage: 60 wt % to 90 wt % of the polymer, 10 wt % to 30 wt % of the lithium salt, and 0) wt % to 10 wt % of an additive.

For example, the mass percentage of the polymer is 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %.

For example, the mass percentage of the lithium salt is 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

For example, the mass percentage of the additive is 0 wt %, 1 wt %, 2 wt %, 3 wt %, 4 wt %, 5 wt %, 6 wt %, 7 wt %, 8 wt %, 9 wt %, or 10 wt %.

According to a solution of the present disclosure, the lithium salt is selected from one or any combination of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium bis(oxalate) borate (LiBOB), lithium difluoro (oxalate) borate (LiDFOB), lithium bis(fluorosulfonyl)imide (LiFSI), lithium bis(trifluoromethanesulfonyl)imide (LiTFSI), lithium trifluoromethanesulfonate ($LiCF_3SO_3$), lithium bis(malonato) borate (LiBMB), lithium (malonato oxalato) borate (LiMOB), lithium hexafluoroantimonate ($LiSbF_6$), lithium difluorophosphate ($LiPF_2O_2$), lithium 4,5-dicyano-2-(trifluoromethyl) imidazole (LIDTI), LIN $(SO_2C_2F_5)$ 2, or LiC $(SO_2CF_3)_3$.

According to a solution of the present disclosure, the additive includes at least one of an oxide electrolyte, a nano-filler, or an organic additive.

The oxide electrolyte is selected from at least one of lithium phosphate, lithium titanate, lithium titanium phosphate, lithium aluminum titanium phosphate, lithium lanthanum titanate, lithium lanthanum tantalate, lithium aluminum germanium phosphate, lithium aluminosilicate, lithium silicon phosphate, or diboron trioxide-doped lithium phosphate.

The nano-filler is selected from at least one of alumina, magnesia, boehmite, barium sulfate, barium titanate, zinc oxide, calcium oxide, silicon dioxide, silicon carbide, or nickel oxide.

The organic additive is selected from methoxy polyethylene glycol borate (B-PEG), methoxy polyethylene glycol aluminate (Al-PEG), succinonitrile, vinyl ethylene carbonate, vinylene carbonate, fluoroethylene carbonate, tetraethylene glycol dimethyl ether.

According to a solution of the present disclosure, the positive electrode plate is used in a solid-state battery (for example, an all-solid-state battery).

According to a solution of the present disclosure, a porosity of the positive electrode plate is less than 5%.

According to a solution of the present disclosure, an elongation rate of the positive electrode active material layer in the positive electrode plate ranges from 30% to 300%.

According to a solution of the present disclosure, a surface density of the positive electrode plate ranges from 5 $mg/cm^2$ to 30 $mg/cm^2$.

According to a solution of the present disclosure, a thickness of the positive electrode plate ranges from 50 μm to 200 μm.

The present disclosure further provides a method for preparing the foregoing positive electrode plate. The method includes the following steps:

uniformly mixing a solvent, a positive electrode active material, a conductive agent, a polymer monomer represented by formula 7, an initiator, a lithium salt, and an additive, to prepare positive electrode slurry; and coating the positive electrode slurry on a surface of a positive electrode current collector, followed by drying and hot pressing, to obtain the positive electrode plate.

According to a solution of the present disclosure, the positive electrode slurry contains 200 to 1000 parts by mass of the solvent, 70 to 98 parts by mass of the positive electrode active material, 1 to 15 parts by mass of the conductive agent, and 1 to 28 parts by mass of the polymer monomer represented by formula 7, the initiator, an optional additive, the lithium salt, and 0 to 10 parts by mass of a binder.

According to a solution of the present disclosure, an adding amount of the initiator is 0.05% to 1% of a mass of the polymer monomer represented by formula 7.

According to a solution of the present disclosure, the initiator may be one or more of azobisisobutyronitrile, 2,2'-Azobis(2,4-dimethyl) valeronitrile, dimethyl 2,2'-azobis(2-methylpropionate), benzoyl peroxide, tert-butyl peroxybenzoate, ethyl 4-(dimethylamino)benzoate, methyl-2-benzoyl benzoate, or the like.

According to a solution of the present disclosure, the solvent is selected from at least one of N-methyl pyrrolidone, acetonitrile, hydrofluoroether, acetone, tetrahydrofuran, dichloromethane, pyridine, xylene, toluene, and the like.

According to a solution of the present disclosure, the positive electrode slurry is preferably sieved positive electrode slurry, for example, positive electrode slurry sieved with a 200-mesh sieve.

According to a solution of the present disclosure, a temperature for the drying ranges from 60° C. to 120° C.; and time of the drying ranges from 6 hours to 36 hours. Further, preferably, the drying is carried out under a vacuum condition.

According to a solution of the present disclosure, a temperature for the hot pressing ranges from 50° C. to 90° C.; and time of the hot pressing ranges from 5 minutes to 300 minutes.

It is found through research that, the positive electrode plate of the present disclosure may be obtained by dissolving the positive electrode active material, the conductive agent, an optional binder, the polymer monomer, the initiator, the lithium salt, and the additive in the solvent, and after uniform mixing, coating a surface of the positive electrode current collector, followed by drying and hot pressing on the positive electrode plate.

In the positive electrode slurry, due to small molecular weight and short polymer chain segment, the polymer monomer can be fully mixed with the positive electrode active material, the conductive agent, the optional binder, and the lithium salt. An efficient lithium-conducting and electricity-conducting network has been formed in the positive electrode active material layer after the solvent is removed; and vacuuming and hot pressing are performed on positive electrode active material layer. In one aspect, the hot pressing is to induce thermal polymerization of the polymer monomer. The polymer monomer is a viscous liquid, semi-solid or solid at room temperature. At high temperature, the polymer monomer becomes a flowable liquid that may be fully immersed in pores in the electrode plate. Thermally-induced polymerization is carried out in the pores. A thermal polymerization process (time and temperature) may be regulated, to ensure lithium-conducting and electricity-conducting performance of the positive electrode plate. In the other aspect, for the polymer process of vacuuming and hot pressing, the vacuuming can remove air between particles in the electrode plate; and the hot pressing can ensure that compaction of the electrode plate is closer to practical application. The foregoing process is mainly used to ensure electrode plate performance of low porosity, efficient lithium conduction, and efficient electricity conduction.

The present disclosure further provides a solid-state battery. The solid-state battery includes the foregoing positive electrode plate.

The present disclosure is further described in detail below with reference to specific examples. It should be understood that the following examples are merely used to illustrate and explain the present disclosure, and shall not be construed as limitation to the protection scope of the present disclosure. All technologies implemented based on the foregoing content of the present disclosure shall fall within the protection scope of the present disclosure.

Experimental methods used in the following examples are conventional methods unless otherwise specified. Reagents, materials, and the like that are used in the following examples may be all obtained from commercial sources unless otherwise specified.

A structural formula of polyether acrylate or polyether methacrylate used in the following examples is represented by formula 7:

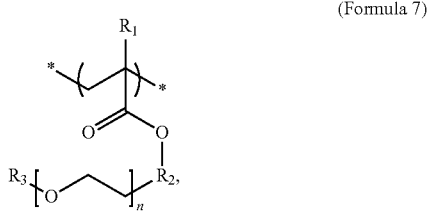

(Formula 7)

If polyether acrylate is used, $R_1$ is H, $R_2$ is absent, and $R_3$ is H.

If polyether methacrylate is used, $R_1$ is $CH_3$, $R_2$ is absent, and $R_3$ is H.

A structural formula of polyether borate used in the following examples is represented by formula 8:

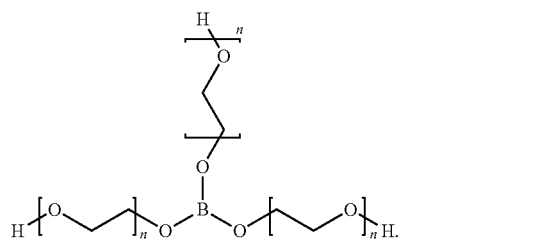

(Formula 8)

A structural formula of polyether aluminate used in the following examples is represented by formula 9:

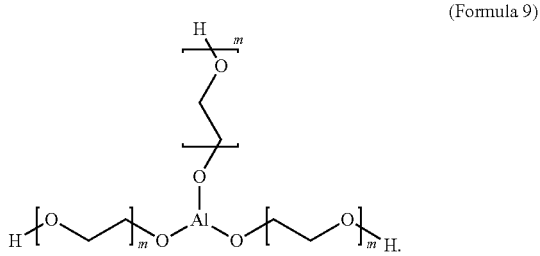

(Formula 9)

A structural formula of polyether phosphate used in the following examples is represented by formula 10:

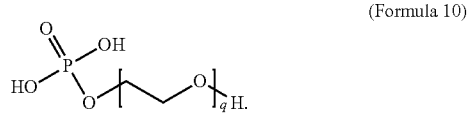

(Formula 10)

Example 1

(1) Preparation of a Positive Electrode Plate:

92 g of a positive electrode active material (lithium cobaltate), 3 g of polyether borate acrylate, 0.33 g of LiDFOB, 1.67 g of LiTFSI, 1 g of a binder (polyvinylidene fluoride (PVDF)), 1.5 g of a conductive agent (conductive carbon black), 0.5 g of a conductive agent (carbon nanotube), and 0.01 g of azobisisobutyronitrile were mixed; 600 g of N-methyl pyrrolidone (NMP) was added; stirring was carried out under the action of a vacuum mixer until a uniform fluid positive electrode slurry was obtained; the positive electrode slurry was uniformly applied on aluminum foil with a thickness of 9 μm; drying was carried out at 80° C. for 36 hours; vacuum treatment was carried out to obtain an electrode plate; hot pressing was performed on the electrode plate at 60° C. for 160 minutes; and cutting was carried out to obtain the positive electrode plate.

(2) Preparation of a Negative Electrode Plate:

20 g of silicon monoxide, 5 g of lithium metal powder, 3 g of a conductive agent (conductive carbon black), and 2 g of a binder (oil-based acrylate) were dissolved in 100 g of p-xylene and uniformly mixed; and the mixture was applied onto a surface of copper foil of a negative electrode current collector, followed by drying (with argon gas at 80° C. for 20 hours), rolling, and die cutting, to obtain the negative electrode plate.

(3) Preparation of a Solid Electrolyte Film:

25 g of polyethylene oxide, 6 g of LiTFSI, and 500 g of acetonitrile were added together into a reactor; stirring was carried out at a speed of 2000 r/min for 24 hours under the protection of inert gas: the slurry was applied onto a surface of a flat polytetrafluoroethylene plate; and the solvent was removed to obtain the solid electrolyte film.

(4) Preparation of a Lithium-Ion Battery:

The positive electrode plate, the solid electrolyte film, and the negative electrode plate obtained above were stacked to prepare a solid lithium-ion battery cell; and the lithium-ion battery was obtained after welding and packaging.

Comparative Example 1.1

For a specific process, refer to Example 1. A main difference lies in that polyether borate was used in Comparative Example 1.1 to replace polyether borate acrylate in Example 1. Other conditions were the same as those in Example 1.

Comparative Example 1.2

For a specific process, refer to Example 1. A main difference lies in that a mixture of polyether borate and polyacrylate that has the same mass as a polyether borate acrylate monomer was used in Comparative Example 1.2 to replace polyether borate acrylate in Example 1. A mass ratio of polyether borate to polyacrylate was a molecular weight ratio of polyether borate to acrylate in the polyether borate acrylate monomer. Other conditions were the same as those in Example 1.

Comparative Example 1.3

For a specific process, refer to Example 1. A main difference lies in that polyether acrylate having the same mass as a polyether borate acrylate monomer was used in Comparative Example 1.3 to replace polyether borate acrylate in Example 1. Other conditions were the same as those in Example 1.

OTHER EXAMPLES AND COMPARATIVE EXAMPLES

For a specific process, refer to Example 1. Main differences lie in a process condition, an adding amount of each component, and a material type of each component. For specific details, refer to Table 1 and Table 2. Examples 1 to 7 in Table 1 further contain 0.01 g of initiators. All the initiators were azobisisobutyronitrile. In a comparative examples with two polymers added in Table 2, a mass ratio between adding amounts of the two polymers was a ratio between molecular weights of a polymer chain segment and poly(methyl) acrylate in a polymerized monomer added in a corresponding example. For details, refer to description of Comparative Examples 1 and 2. Additives added in Example 7, Example 7.1, Example 7.2, and Example 7.3 were an oxide electrolyte (lithium aluminum titanium phosphate).

TABLE 1

Contents of components of positive electrode plates in examples and comparative examples

| Number | Solvent/g | Positive electrode active material/g | Conductive agen/g | Polymer or monomer thereof/g | Lithium salt/g | Binder/g | Additive/g | Drying temperature (° C.) | Drying time (h) | Hot-pressing temperature (° C.) | Hot-pressing time (min) |
|---|---|---|---|---|---|---|---|---|---|---|---|
| Example 1 | 600 | 92 | 2 | 3 | 2 | 1 | 0 | 80 | 36 | 60 | 160 |
| Comparative Example 1.1 | 600 | 92 | 2 | 3 | 2 | 1 | 0 | 80 | 36 | 60 | 160 |
| Comparative Example 1.2 | 600 | 92 | 2 | 3 | 2 | 1 | 0 | 80 | 36 | 60 | 160 |
| Comparative Example 1.3 | 600 | 92 | 2 | 3 | 2 | 1 | 0 | 80 | 36 | 60 | 160 |
| Example 2 | 800 | 75 | 7.5 | 12 | 5 | 0.5 | 0 | 90 | 24 | 70 | 100 |
| Comparative Example 2.1 | 800 | 75 | 7.5 | 12 | 5 | 0.5 | 0 | 90 | 24 | 70 | 100 |
| Comparative Example 2.2 | 800 | 75 | 7.5 | 12 | 5 | 0.5 | 0 | 90 | 24 | 70 | 100 |
| Comparative Example 2.3 | 800 | 75 | 7.5 | 12 | 5 | 0.5 | 0 | 90 | 24 | 70 | 100 |
| Example 3 | 500 | 70 | 8 | 15 | 5 | 2 | 0 | 115 | 6 | 80 | 60 |
| Comparative Example 3.1 | 500 | 70 | 8 | 15 | 5 | 2 | 0 | 115 | 6 | 80 | 60 |
| Comparative Example 3.2 | 500 | 70 | 8 | 15 | 5 | 2 | 0 | 115 | 6 | 80 | 60 |
| Comparative Example 3.3 | 500 | 70 | 8 | 15 | 5 | 2 | 0 | 115 | 6 | 80 | 60 |
| Example 4 | 700 | 90 | 3 | 5.5 | 1 | 0.5 | 0 | 110 | 16 | 90 | 5 |
| Comparative Example 4.1 | 700 | 90 | 3 | 5.5 | 1 | 0.5 | 0 | 110 | 16 | 90 | 5 |
| Comparative Example 4.2 | 700 | 90 | 3 | 5.5 | 1 | 0.5 | 0 | 110 | 16 | 90 | 5 |
| Comparative Example 4.3 | 700 | 90 | 3 | 5.5 | 1 | 0.5 | 0 | 110 | 16 | 90 | 5 |
| Example 5 | 650 | 82 | 4 | 10 | 4 | 0 | 0 | 100 | 10 | 75 | 30 |
| Comparative Example 5.1 | 650 | 82 | 4 | 10 | 4 | 0 | 0 | 100 | 10 | 75 | 30 |
| Comparative Example 5.2 | 650 | 82 | 4 | 10 | 4 | 0 | 0 | 100 | 10 | 75 | 30 |
| Comparative Example 5.3 | 650 | 82 | 4 | 10 | 4 | 0 | 0 | 100 | 10 | 75 | 30 |
| Example 6 | 200 | 70 | 8 | 12 | 8 | 2 | 0 | 80 | 20 | 55 | 95 |
| Comparative Example 6.1 | 200 | 70 | 8 | 12 | 8 | 2 | 0 | 80 | 20 | 55 | 95 |
| Comparative Example 6.2 | 200 | 70 | 8 | 12 | 8 | 2 | 0 | 80 | 20 | 55 | 95 |
| Comparative Example 6.3 | 200 | 70 | 8 | 12 | 8 | 2 | 0 | 80 | 20 | 55 | 95 |
| Example 7 | 360 | 72 | 7 | 11 | 7 | 1.8 | 1.2 | 90 | 30 | 75 | 90 |
| Comparative Example 7.1 | 360 | 72 | 7 | 11 | 7 | 1.8 | 1.2 | 90 | 30 | 75 | 90 |
| Comparative Example 7.2 | 360 | 72 | 7 | 11 | 7 | 1.8 | 1.2 | 90 | 30 | 75 | 90 |
| Comparative Example 7.3 | 360 | 72 | 7 | 11 | 7 | 1.8 | 1.2 | 90 | 30 | 75 | 90 |

TABLE 2

Composition of positive electrode plates in examples and comparative examples

| Number | Solvent | Positive electrode active material | Conductive agent | Polymer monomer/ Polymer | Binder | Lithium salt |
|---|---|---|---|---|---|---|
| Example 1 | NMP | Lithium cobaltate | Conductive carbon black:carbon nanotube (3:1) | Polyether borate acrylate (monomer molecular weight: 600 Da; polymer molecular weight: 20,000 Da) | PVDF | LiDFOB:LiTFSI (1:5) |
| Comparative Example 1.1 | | | | Polyether borate (molecular weight: 20,000 Da) | | |
| Comparative Example 1.2 | | | | Polyether borate (molecular weight: 20,000 Da) + polyacrylate (molecular weight: 20,000 Da) | | |
| Comparative Example 1.3 | | | | Polyether acrylate (monomer molecular weight: 600 Da; polymer molecular weight: 20,000 Da) | | |
| Example 2 | Acetonitrile | Lithium iron phosphate | Conductive carbon black:ketjen black (2:1) | Polyether aluminate acrylate (monomer molecular weight: 950 Da; polymer molecular weight: 10,000 Da) | PVDF | LiFSI:LiTFSI (1:3) |
| Comparative Example 2.1 | | | | Polyether aluminate (molecular weight: 100,000 Da) | | |
| Comparative Example 2.2 | | | | Polyether aluminate (molecular weight: 100,000 Da) + polyacrylate (molecular weight: 100,000 Da) | | |
| Comparative Example 2.3 | | | | Polyether acrylate (monomer molecular weight: 950 Da; polymer molecular weight: 100,000 Da) | | |
| Example 3 | DMF | Lithium-rich manganese-based material | Conductive fiber:carbon nanotube | Polyether phosphate acrylate (monomer molecular weight: 1500 Da; polymer molecular weight: 150,000 Da) | PVDF | LiBF$_4$:LiFSI (3:1) |
| Comparative Example 3.1 | | | | Polyether phosphate (molecular weight: 150,000 Da) | | |
| Comparative Example 3.2 | | | (1:1) | Polyether phosphate (molecular weight: 15,000 Da) + polyacrylate (molecular weight: 150,000 Da) | | |
| Comparative Example 3.3 | | | | Polyether acrylate (monomer molecular weight: 1500 Da; polymer molecular weight: 150,000 Da) | | |
| Example 4 | Acetone | Nickel-cobalt-manganese ternary material | Carbon nanotube:graphene (1:2) | Polyether borate methacrylate (monomer molecular weight: 300 Da; polymer molecular weight: 10,000 Da) | PVDF | LiBOB:LiTFSI (1:4) |
| Comparative Example 4.1 | | | | Polyether borate (molecular weight: 10,000 Da) | | |
| Comparative Example 4.2 | | | | Polyether borate (molecular weight: 10,000 Da) + poly(methyl acrylate) (molecular weight: 10,000 Da) | | |
| Comparative Example 4.3 | | | | Polyether methacrylate (monomer molecular weight: 300 Da; polymer molecular weight: 10,000 Da) | | |

TABLE 2-continued

Composition of positive electrode plates in examples and comparative examples

| Number | Solvent | Positive electrode active material | Conductive agent | Polymer monomer/ Polymer | Binder | Lithium salt |
|---|---|---|---|---|---|---|
| Example 5 | DMF | Nickel-cobalt-aluminum ternary material | Conductive carbon black:carbon nanotube (2:1) | Polyether aluminate methacrylate (monomer molecular weight: 1000 Da; polymer molecular weight: 50,000 Da) | N/A | LiFSI:LiTFSI (1:2) |
| Comparative Example 5.1 | | | | Polyether aluminate (molecular weight: 50,000 Da) | | |
| Comparative Example 5.2 | | | | Polyether aluminate (molecular weight: 50,000 Da) + poly(methyl acrylate) (molecular weight: 50,000 Da) | | |
| Comparative Example 5.3 | | | | Polyether methacrylate (monomer molecular weight: 1000 Da; polymer molecular weight: 50,000 Da) | | |
| Example 6 | NMP:acetonitrile (6:1) | Nickel-cobalt-manganese ternary material | Carbon nanotube:flake graphite (3:1) | Polyether phosphate methacrylate (monomer molecular weight: 400 Da; polymer molecular weight: 200,000 Da) | PVDF | $LiBF_4$:LiBOB:LiTFSI (1:2:3) |
| Comparative Example 6.1 | | | | Polyether phosphate (molecular weight: 200,000 Da) | | |
| Comparative Example 6.2 | | | | Polyether phosphate (molecular weight: 200,000 Da) + poly(methyl acrylate) (molecular weight: 200,000 Da) | | |
| Comparative Example 6.3 | | | | Polyether methacrylate (monomer molecular weight: 400 Da; polymer molecular weight: 200,000 Da) | | |
| Example 7 | NMP:acetonitrile (3:1) | Nickel-cobalt-manganese ternary material | Carbon nanotube:flake graphite (3:1) | Polyether borate methacrylate (monomer molecular weight: 400 Da; polymer molecular weight: 200,000 Da) | PVDF | $LiBF_4$:LiBOB:LiTFSI (1:2:3) |
| Comparative Example 7.1 | | | | Polyether borate (molecular weight: 200,000 Da) | | |
| Comparative Example 7.2 | | | | Polyether borate (molecular weight: 200,000 Da) + poly(methyl acrylate) (molecular weight: 200,000 Da) | | |

Test Example 1

Battery internal resistance AC impedance tests, electrode plate porosity tests and electrode plate elongation rate tests were performed on lithium-ion batteries in the foregoing examples and comparative examples. Test results are shown in Table 3.

TABLE 3

Battery internal resistances, porosities of positive electrode plates, and elongation rates of positive electrode active material layers in examples and comparative examples

| Number | Porosity (%) | Elongation rate (%) | Battery internal resistance (mΩ) |
|---|---|---|---|
| Example 1 | 3.21 | 32.31 | 13.32 |
| Comparative Example 1.1 | 27.21 | 12.42 | 57.43 |
| Comparative Example 1.2 | 26.22 | 5.47 | 95.54 |
| Comparative Example 1.3 | 3.41 | 36.32 | 14.25 |
| Example 2 | 1.25 | 220.42 | 11.23 |
| Comparative Example 2.1 | 25.46 | 180.45 | 55.34 |
| Comparative Example 2.2 | 26.98 | 70.93 | 87.64 |
| Comparative Example 2.3 | 1.34 | 231.29 | 12.83 |
| Example 3 | 3.24 | 270.63 | 18.83 |
| Comparative Example 3.1 | 24.42 | 220.52 | 63.89 |
| Comparative Example 3.2 | 22.37 | 50.63 | 97.27 |
| Comparative Example 3.3 | 3.65 | 290.32 | 19.34 |
| Example 4 | 0.61 | 50.96 | 10.53 |
| Comparative Example 4.1 | 24.58 | 23.63 | 42.73 |
| Comparative Example 4.2 | 26.97 | 6.23 | 77.79 |

TABLE 3-continued

Battery internal resistances, porosities of positive electrode plates, and elongation rates of positive electrode active material layers in examples and comparative examples

| Number | Porosity (%) | Elongation rate (%) | Battery internal resistance (mΩ) |
|---|---|---|---|
| Comparative Example 4.3 | 0.93 | 52.95 | 12.35 |
| Example 5 | 3.52 | 200.93 | 14.13 |
| Comparative Example 5.1 | 21.95 | 140.23 | 62.48 |
| Comparative Example 5.2 | 22.46 | 75.93 | 106.38 |
| Comparative Example 5.3 | 4.38 | 214.53 | 15.63 |
| Example 6 | 0.83 | 220.09 | 13.76 |
| Comparative Example 6.1 | 23.36 | 130.34 | 64.63 |
| Comparative Example 6.2 | 25.93 | 85.38 | 108.82 |
| Comparative Example 6.3 | 1.04 | 234.82 | 14.82 |
| Example 7 | 3.21 | 160.02 | 12.84 |
| Comparative Example 7.1 | 28.93 | 120.46 | 57.67 |
| Comparative Example 7.2 | 27.67 | 65.75 | 131.93 |
| Comparative Example 7.3 | 4.32 | 184.68 | 13.68 |

The battery internal resistance AC impedance tests were carried out according to the following method: AC impedance tests were performed on lithium-ion batteries at 60° C. and in a range of 100 KHz to 0.1 mHz by a Metrohm PGSTAT302N chemical workstation.

The electrode plate porosity tests were carried out according to the following method: A porosity of an electrode plate was tested by using an AutoPore V 9610 mercury porosimeter; a specific electrode plate was placed in a dilatometer to apply high-pressure sealing oil: thread-based sealing was carried out after capping; and the dilatometer was placed in a high-pressure system for pressure testing the porosity of the electrode plate under high pressure.

The electrode plate elongation rate tests were carried out according to the following method: The positive electrode slurry was applied onto a smooth and flat surface, followed by drying and hot pressing to obtain a paste layer; and then a 60 mm*20 mm*1 mm (length*width*thickness) sample was prepared for an elongation test on a hydraulic universal material testing machine GH-969C.

Results of the porosity tests show that: in the examples of the present disclosure, a positive electrode plate prepared via in-situ polymerization of a polymer monomer with a specific structure has a low porosity; and in the comparative examples, an effect of low porosity cannot be achieved by using a molded polymer. However, a low porosity may be obtained when in-situ polymerization is performed on the polyether acrylate monomer shown in the comparative example 1.3. A main reason is that a polymer monomer with a specific structure is in a liquid state under a heating condition, so that the polymer monomer can fully contact with a positive electrode active material, a conductive agent, and a binder, and enter space between pores of particles to implement in-situ polymerization between the pores, that is, a positive electrode plate having a low porosity is prepared.

Results of the elongation rate tests show that: it may be learned from comparison between elongation rates of positive electrode active material layers in Examples 1 to 7 of the present disclosure that, an elongation rate of a positive electrode active material layer is related to an adding amount of a polymer monomer and a polymerization degree of a polymer. According to comparison between the examples and the comparative examples, the polymer monomer with the specific structure of the present disclosure has a function of a comb-like polymer, a main chain is a carbon-carbon bond, and branched chains are a borate structure, a phosphate structure, and an aluminate structure. The comb-like polymer may effectively bind particulate materials in a positive electrode plate, thereby having a good high-elastic state and a high elongation rate.

Results of the battery internal resistance tests show that: the polymer monomer with the specific structure shown in the examples of the present disclosure may effectively bond particles in a positive electrode plate. In addition, the polymer monomer with the specific structure has a comb-like structure, and branched chains may be capable of conducting lithium. Therefore, a positive electrode plate prepared according to Examples 1 to 7 has a low internal resistance. However, in the comparative examples, porosities are relatively high, and polyether acrylate (or polyether methacrylate) does not conduct lithium. Thus, a positive electrode plate prepared according to a method in the comparative example has a high internal resistance.

Test Example 2

Battery cycling performance tests were performed on lithium-ion batteries in the foregoing examples and comparative examples. A test process is as follows:

Charge and discharge cycle tests were performed on a lithium-ion battery on a LAND battery charge and discharge test cabinet. The test conditions was 60° C., and charging and discharging were carried out at 0.3 C/0.3 C. A quantity of cycles was evaluated when a battery capacity retention was decreased to 80%.

Test results are shown in Table 4.

TABLE 4

Cycling performance of batteries in examples and comparative examples

| Number | Cycling performance 0.3 C/0.3 C |
|---|---|
| Example 1 | 940 cycles (80%) |
| Comparative Example 1.1 | 360 cycles (80%) |
| Comparative Example 1.2 | 190 cycles (80%) |
| Comparative Example 1.3 | 450 cycles (80%) |
| Example 2 | 2630 cycles (80%) |
| Comparative Example 2.1 | 1300 cycles (80%) |
| Comparative Example 2.2 | 730 cycles (80%) |
| Comparative Example 2.3 | 2100 cycles (80%) |
| Example 3 | 420 cycles (80%) |
| Comparative Example 3.1 | 151 cycles (80%) |
| Comparative Example 3.2 | 79 cycles (80%) |
| Comparative Example 3.3 | 232 cycles (80%) |
| Example 4 | 1610 cycles (80%) |
| Comparative Example 4.1 | 854 cycles (80%) |
| Comparative Example 4.2 | 535 cycles (80%) |
| Comparative Example 4.3 | 745 cycles (80%) |
| Example 5 | 1579 cycles (80%) |
| Comparative Example 5.1 | 810 cycles (80%) |
| Comparative Example 5.2 | 428 cycles (80%) |
| Comparative Example 5.3 | 1015 cycles (80%) |
| Example 6 | 1138 cycles (80%) |
| Comparative Example 6.1 | 531 cycles (80%) |
| Comparative Example 6.2 | 261 cycles (80%) |
| Comparative Example 6.3 | 645 cycles (80%) |
| Example 7 | 1353 cycles (80%) |
| Comparative Example 7.1 | 642 cycles (80%) |
| Comparative Example 7.2 | 327 cycles (80%) |
| Comparative Example 7.3 | 861 cycles (80%) |

Results of the cycling performance tests in the examples and the comparative examples show that: the positive electrode plate of the present disclosure has a low porosity and a small internal resistance, which makes a prepared battery have a high cycling performance. The positive electrode plate in the comparative examples has a high porosity and a large internal resistance. As a result, a quantity of effective cycles of a prepared battery is significantly decreased. The present disclosure introduces structures such as a borate structure, an aluminate structure, and a phosphate structure, high voltage-resistant performance and lithium-ion dissociation of an electrolyte in a positive electrode are improved, and lithium-conducting performance and cycling performance of a battery are also improved.

Test Example 3

Figure 2:
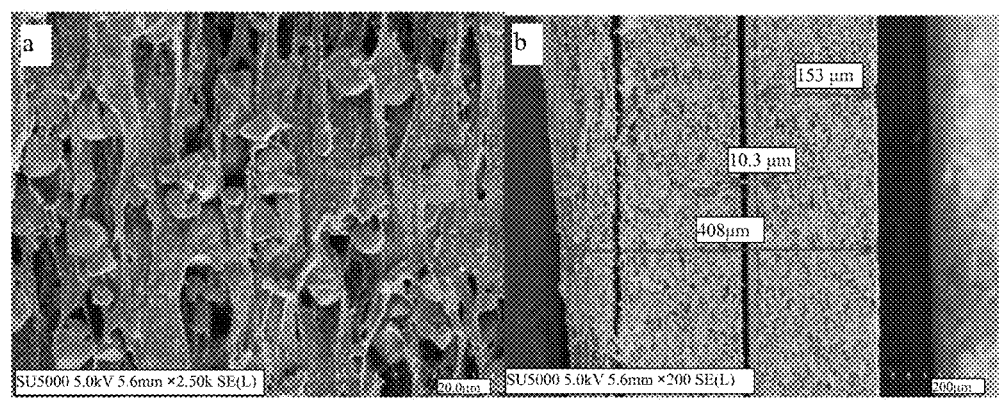
FIG. 2 is a cross-section SEM image of a positive electrode plate prepared according to Comparative Example 6.2; wherein, (a) of FIG. 2 is a SEM image magnified by 2,500 times, the scale bar is 20 μm; and (b) of FIG. 2 is a SEM image magnified by 500 times, the scale bar is 200 μm.

SEM tests were performed on cross sections of the positive electrode plates prepared in Example 6 and Comparative Example 6.2. Results of the SEM tests are shown in FIG. 1 and FIG. 2.

The cross section of the positive electrode plate was tested according to the following method: An aluminum foil current collector was coated with the positive electrode slurry in the present disclosure: after drying, a sample was crosscut: vacuuming and metal spraying were carried out for sample preparation; and a cross section of a coating region was observed by using Hitachi's novel thermal field emission scanning electron microscope SU5000.

SEM results of the cross section of the electrode plates prepared according to Example 6 and Comparative Example 6.2 show that: with the same positive electrode loading capacity, the electrode plate prepared according to Example 6 has higher compaction, lower porosity, and better interfacial contact. Therefore, the electrode plate prepared in the present disclosure has good performance.

The foregoing illustrates implementation of the present disclosure. However, the present disclosure is not limited to the foregoing implementation. Any modifications, equivalent replacements, and improvements made without departing from the spirit and principle of the present disclosure shall fall within the protection scope of the present disclosure.

What is claimed is:

1. A positive electrode plate, comprising a positive electrode current collector and a positive electrode active material layer applied on a surface of either or both sides of the positive electrode current collector; wherein the positive electrode active material layer comprises a positive electrode active material, a conductive agent, and a polymer electrolyte; the polymer electrolyte comprises a polymer, an additive and a lithium salt; and the polymer comprises a repeated unit represented by the following formula 1:

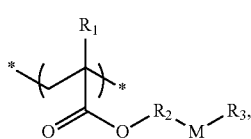

Formula 1 wherein $R_1$ is selected from H or a $C_{1-6}$ alkyl group; $R_2$ is a linking group; $R_3$ is an end-capping group; M is a phosphate chain segment having a structural unit represented by formula 5; and * denotes a linking end;

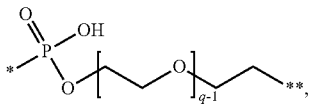

Formula 5 wherein * denotes a linking end to $R_3$, ** denotes a linking end to $R_2$, and q is a polymerization degree; and the additive comprises at least one of an oxide electrolyte, or an organic additive.

2. The positive electrode plate according to claim 1, wherein $R_1$ is selected from H or a $C_{1-3}$ alkyl group; and/or $R_3$ is selected from H, OH, or COOH.

3. The positive electrode plate according to claim 1, wherein $R_1$ is selected from H or a methyl group.

4. The positive electrode plate according to claim 1, wherein a number average molecular weight of M ranges from 200 Da to 10,000 Da.

5. The positive electrode plate according to claim 1, wherein the polymer is selected from at least one of poly (polyether phosphate acrylate), or poly(polyether phosphate methacrylate).

6. The positive electrode plate according to claim 5, wherein a number average molecular weight of the polymer ranges from 4,000 Da to 300,000 Da.

7. The positive electrode plate according to claim 1, wherein a monomer for preparing the polymer is selected from a compound represented by the following formula 6:

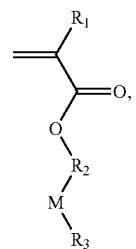

Formula 6 wherein $R_1$, $R_2$, $R_3$, and M are defined as above.

8. The positive electrode plate according to claim 7, wherein the monomer for preparing the polymer is formed into a polymer monomer in advance, and the polymer monomer is selected from at least one of polyether phosphate acrylate, or polyether phosphate methacrylate.

9. The positive electrode plate according to claim 1, wherein the positive electrode active material layer further comprises a binder, and comprises components of the following mass percentage: 70 wt % to 98 wt % of the positive electrode active material, 1 wt % to 15 wt % of the conductive agent, 1 wt % to 28 wt % of the polymer electrolyte, and 1 wt % to 10 wt % of the binder.

10. The positive electrode plate according to claim 9, wherein the binder is selected from at least one of polyvinylidene fluoride, polytetrafluoroethylene, polyvinylidene fluoride-hexafluoropropylene, or lithium polyacrylate.

11. The positive electrode plate according to claim 1, wherein the polymer electrolyte comprises components of the following mass percentage: 60 wt % to 90 wt % of the polymer, 10 wt % to 30 wt % of the lithium salt, and 1 wt % to 10 wt % of the additive.

12. The positive electrode plate according to claim 1, wherein the positive electrode active material is selected from a combination of one or more of lithium iron phosphate, lithium cobalt oxide, lithium nickel cobalt manganese oxide, lithium manganate, lithium nickel cobalt aluminum oxide, lithium nickel cobalt manganese aluminum oxide, a nickel-cobalt-aluminum-tungsten material, a lithium-rich manganese-based solid solution positive electrode material, lithium nickel cobalt oxide, lithium nickel titanium magnesium oxide, lithium nickel oxide, spinel lithium manganese oxide, and a nickel-cobalt-tungsten material.

13. The positive electrode plate according to claim 1, wherein the lithium salt is selected from one or any combination of lithium perchlorate, lithium hexafluorophosphate, lithium hexafluoroarsenate, lithium tetrafluoroborate, lithium bis(oxalate) borate, lithium difluoro (oxalate) borate, lithium bis(fluorosulfonyl)imide, lithium bis(trifluoromethanesulfonyl)imide, lithium trifluoromethanesulfonate lithium bis(malonato) borate, lithium (malonato oxalato) borate, lithium hexafluoroantimonate, lithium difluorophosphate, lithium 4,5-dicyano-2-(trifluoromethyl) imidazole, $LiN(SO_2C_2F_5)_2$, $LiC(SO_2CF_3)_3$.

14. The positive electrode plate according to claim 1, wherein a porosity of the positive electrode plate is less than 5%.

15. The positive electrode plate according to claim 1, wherein an elongation rate of the positive electrode active material layer in the positive electrode plate ranges from 30% to 300%.

16. A solid-state battery, comprising the positive electrode plate according to claim 1.

\* \* \* \* \*